United States Patent
Asakura

(10) Patent No.: US 8,550,554 B2
(45) Date of Patent: Oct. 8, 2013

(54) VEHICLE SEAT

(75) Inventor: Takashi Asakura, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 181 days.

(21) Appl. No.: 13/006,792

(22) Filed: Jan. 14, 2011

(65) Prior Publication Data

US 2012/0074743 A1    Mar. 29, 2012

(30) Foreign Application Priority Data

Sep. 27, 2010   (JP) .................................. 2010-215264

(51) Int. Cl.
*B60R 21/00*   (2006.01)

(52) U.S. Cl.
USPC ....................................................... 297/216.2

(58) Field of Classification Search
USPC ............... 297/216.2, 216.19, 216.16, 216.17, 297/216.18, 325, 216.1, 216.15
See application file for complete search history.

(56) References Cited

U.S. PATENT DOCUMENTS

| 3,951,004 A * | 4/1976 | Heesch .......................... 248/394 |
| 4,190,225 A * | 2/1980 | Bauer et al. .................... 248/394 |
| 6,921,133 B2 * | 7/2005 | Taoka et al. ............... 297/216.16 |
| 7,360,832 B2 | 4/2008 | Yokota et al. |
| 8,061,770 B2 * | 11/2011 | Houston et al. ............ 297/216.2 |

FOREIGN PATENT DOCUMENTS

JP        7132767 A        5/1995

* cited by examiner

*Primary Examiner* — Milton Nelson, Jr.
(74) *Attorney, Agent, or Firm* — Browdy and Neimark, PLLC

(57) ABSTRACT

In a vehicle seat, two front links and two rear links are pivotally connected between a seat cushion frame and a floor of vehicle. One of the two front links is of a sector shape having an arcuate gear region meshed with a drive pinion. Or alternatively, both of the two front links may be of such sector gear configuration, such that one front link is engaged with the drive pinion and the other front link engaged with a free-to-rotate pinion. Hence, both two front links are robust enough to withstand an excessive great load in the case of rear-end collision. By contrast, the two rear links are simply prone to deformation by the excessive great load. Accordingly, the excessive great load is to be intensively exerted upon those two rear links which will in turn be deformed quickly to absorb a corresponding excessive great impact.

2 Claims, 2 Drawing Sheets

VEHICLE SEAT

BACKGROUND OF THE INVENTION

1. Field of the Invention

The present invention relates to a vehicle seat, and in particular, the invention is directed to a vehicle seat including front and rear links which are vertically movable to allow for adjustment in height of seats, the seat being so arranged as to absorb an excessive great impact to be caused therein in the case of rear-end collision.

2. Description of Prior Art

In general, a rear-end collision may be defined to be one of the following two cases: a case where a vehicle collides against a rear side of another vehicle running ahead thereof; and a case where a vehicle running backwards collides at the rear side thereof against another vehicle or something hard. In any of such rear-end collisions, an upper body portion of seat occupant on a seat of the vehicle is abruptly and quickly displaced under inertia to a seat back of the seat, with an excessive great load being applied from the seat occupant to the seat back. This means that an excessive great impact is directly given to the seat back and further imparted to a seat cushion of the seat.

Suppose now that the rear-end collision occurs to a vehicle seat having a seat cushion frame very rigid in the entirety thereof enough to withstand the foregoing excessive great impact. In that case, it is highly possible for the excessive great impact to be intensively imparted to a relatively brittle mechanical part or mechanisms, such as a reclining device. Considering such defective aspect, as commonly done in the art, a deformable area is defined in a predetermined point in either the seat cushion frame or the seat back frame, so that, upon the excessive great impact being imparted to the seat cushion frame, the deformable area is quickly deformed to absorb the excessive great impact, thereby avoiding excessive stress intensively caused in the reclining device or other brittle mechanisms.

Examples of the foregoing impact absorption arrangement include: an impact absorption arrangement in a lateral frame member of seat back frame, as disclosed in the Japanese Laid-Open Patent Publication No. 7-132767 or JP 7-132767 A; and an impact absorption arrangement in a lateral fame member of seat cushion frame, as disclosed in the U.S. Pat. No. 7,360,832.

According to the JP 7-132767, predetermined localized areas in the lateral frame member of seat back frame are so formed to have deformable regions of a wavy cross-section, so that, in the case of rear-end collision, such wavy deformable regions, upon receiving an excessive great load, are buckled or collapsed to absorb a corresponding excessive great impact. On the other hand, the U.S. Pat. No. 7,360,832 teaches a rectangular or closed cross-section configuration of seat cushion frame's lateral frame member and an opened cross-section area defined in that closed cross-section structure, so that, upon an excessive great load being applied to the seat in the case of rear-end collision, a localized wall region of the seat cushion frame's lateral frame member at such opened cross-section area is deformed to thereby absorb a corresponding excessive great impact.

However, the foregoing conventional impact absorption arrangements are not simple in structure and thus require processes forming the complicated deformable areas as well as the peripheral areas around the deformable areas, which in turn requires troublesome designs and adjustments to determine a proper deformability of the deformable areas and also increases costs involved.

SUMMARY OF THE INVENTION

In view of the above-stated drawbacks, it is a purpose of the present invention to provide an improved vehicle seat which is of a simplified structure effective for absorbing an excessive great impact in the case of rear-end collision.

In order to achieve such purpose, a vehicle seat back in accordance with the present invention is basically comprised of;

a seat cushion frame including a first lateral frame member and a second lateral frame member, wherein the first lateral frame member has a forward portion facing forwardly of the vehicle, while the second lateral frame member has a backward portion facing backwardly of the vehicle:

a drive pinion rotatably provided to the first lateral frame member; the drive pinion being operatively connected with a drive source;

a first front link element of sector shape having: a lower end portion pivotally secured on the floor of vehicle; and an upper widened end portion so formed to diverge from the lower end portion, the upper widened end portion being pivotally connected with the forward portion of the first lateral frame member;

the first front link element having an arcuate gear region defined in the upper widened end portion thereof, the arcuate gear region being in meshed engagement with the drive pinion and so arranged as to face backwardly of the seat;

the drive pinion being disposed backward of the arcuate gear region;

a second front link element which is at the upper end portion thereof pivotally connected with the forward portion of the second lateral frame member, while being at the lower end portion thereof pivotally fixed on the floor of vehicle;

the first and second front link elements being interlocked via a connecting element so as to be movable vertically in a synchronized way;

a first rear link element which is at the upper end portion thereof pivotally connected with the backward portion of the first lateral frame member, while being at the lower end portion thereof pivotally fixed on the floor of vehicle; and a second rear link element which is at the upper end portion thereof pivotally connected with the backward portion of the second lateral frame member, while being at the lower end portion thereof pivotally fixed on the floor of vehicle;

wherein the first and second rear link elements are prone to deformation by an excessive great load applied backwardly and downwardly to the seat in case of rear-end collision, thereby absorbing a corresponding excessive great impact caused in the seat.

Preferably, the second front link element may be a second front link element of sector shape which has: an upper widened portion defined in an upper area thereof corresponding to the upper end portion of the second front link element; and an arcuate gear region defined in the upper widened portion. Further, a free-to-rotate pinion may be provided to the second lateral frame member, backwardly of the foregoing arcuate gear region, while being in meshed engagement with that arcuate gear region. In this mode, the connecting element may comprise a connecting shaft rotatably journalled between the first and second lateral frame members and the second and first front link elements of sector shape be fixed on that connecting shaft so as to be rotatable in a synchronized way relative to a central axis of the connecting shaft.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated a preferred embodiment of vehicle seat generally designated by (S) in accordance with the present invention, which is provided with a seat lifter mechanism (not designated) for adjustment in height of the seat.

As shown, the seat (S) is comprised of a seat cushion (SC) and a seat back (SB) rotatably connected with the seat cushion (SC), with a reclining device (not shown) operatively provided at a joint point between the seat cushion and seat back (SC) (SB) to allow the seat back (SB) be adjustably inclined forwardly and backwardly relative to the seat cushion (SC), as known in the art.

Figure 1:
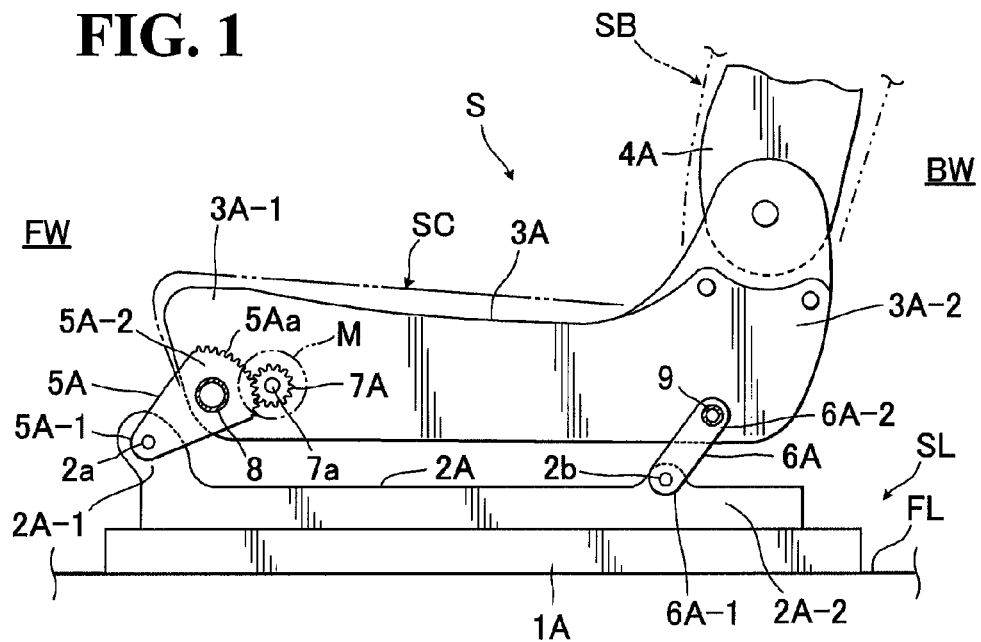
FIG. 1 is a side view showing a left side of vehicle seat and also a left-side seat framework of the vehicle seat in accordance with the present invention.
Figure 3:
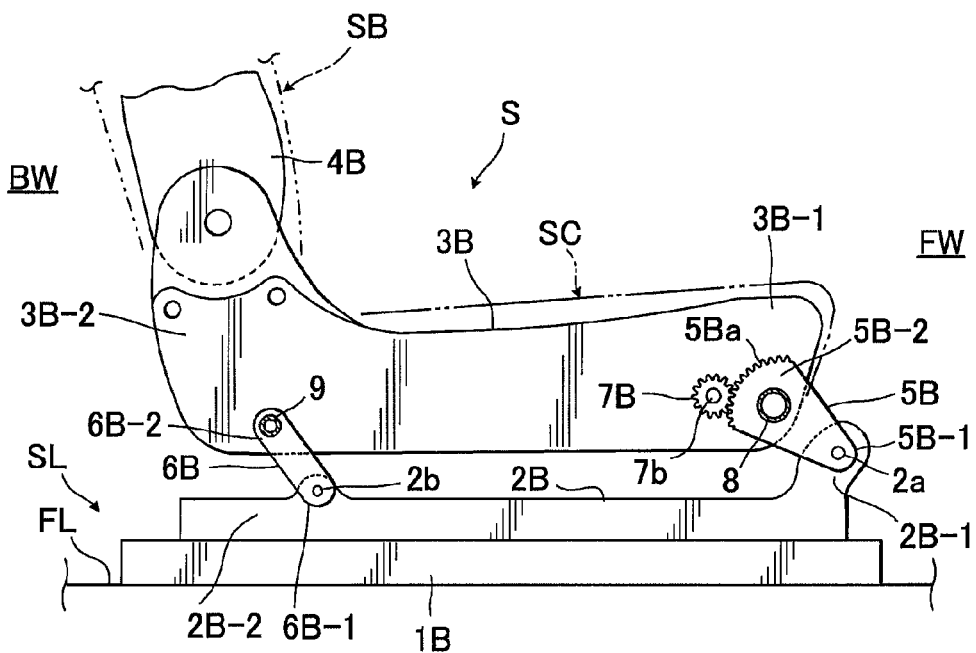
FIG. 3 is a side view showing a right side of vehicle seat and also a right-side seat framework of the vehicle seat.

Looking comparatively at FIG. 1 and FIG. 3, it is to be understood that a pair of left- and right-side lateral frame members (3A) and (3B) are one of the constituent elements of a seat cushion frame (not designated) provided in the seat cushion (SC), whereas a pair of left- and right-side lateral frame members (4A) and (4B) are one of the constituent elements of a seat back frame (not designated) provided in the seat back (SC), as commonly known in the art.

While not shown, as required, a front cross frame member may be fixedly connected between the two forward end portions of the left- and right-side lateral frame members (3A) (3B), and a rear cross frame member be fixedly connected between the two backward end portions respectively of the left- and right-side lateral frame members (3A) (3B), as known in ordinary seat cushion framework.

Of course, an upholstery, which includes a trim cover assembly and a foam padding, is properly attached over the above-described seat cushion frame to form the seat back (SB), and likewise, such upholstery is also properly attached over the above-described seat back frame to form the seat cushion (SC).

It is to be noted that the wording "forward" or "forwardly" refers to a forward side (FW) facing forwardly of the seat (S), whereas the wording "backward" or "backwardly" refers to a backward side (BW) facing backwardly of the seat (S).

Designation (SL) denotes a seat slide device provided between the left- and right-side lateral frame members (3A) (3B) and the floor (FL) for adjustment in position of the seat (S) in forward and backward directions. As shown, the seat slide device (SL) typically comprises a pair of left-side upper and lower rails (2A) and (1A) and a pair of right-side upper and lower rails (2B) and (1B). In any of the left and right-side rails, the upper rails (2A, 2B) are slidably engaged with the respective lower rails (1A, 1B) fixed on the floor (FL), as known in the art.

Figure 2:
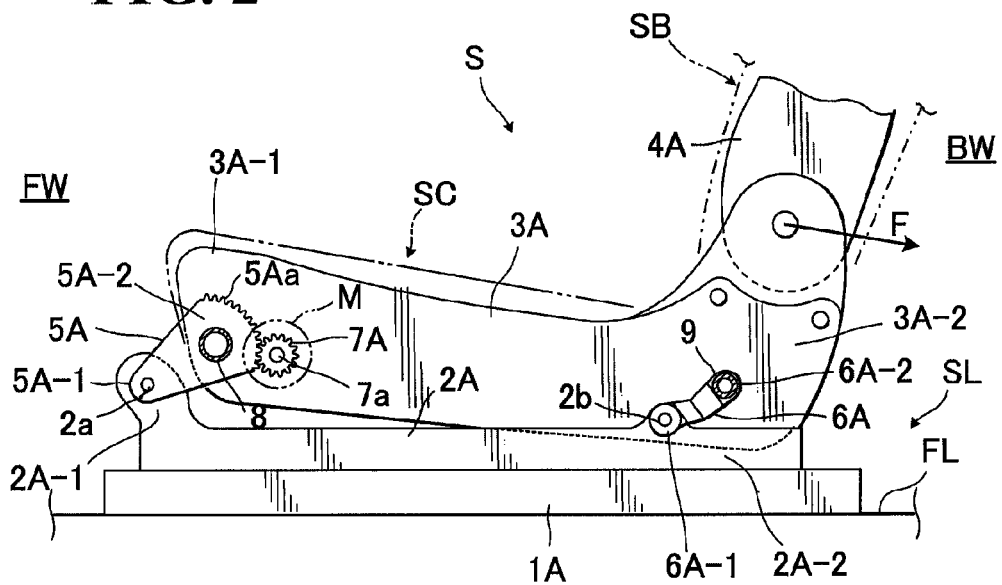
FIG. 2 is a side view of the left side of vehicle seat, which shows deformation of a left-side rear link.
Figure 4:
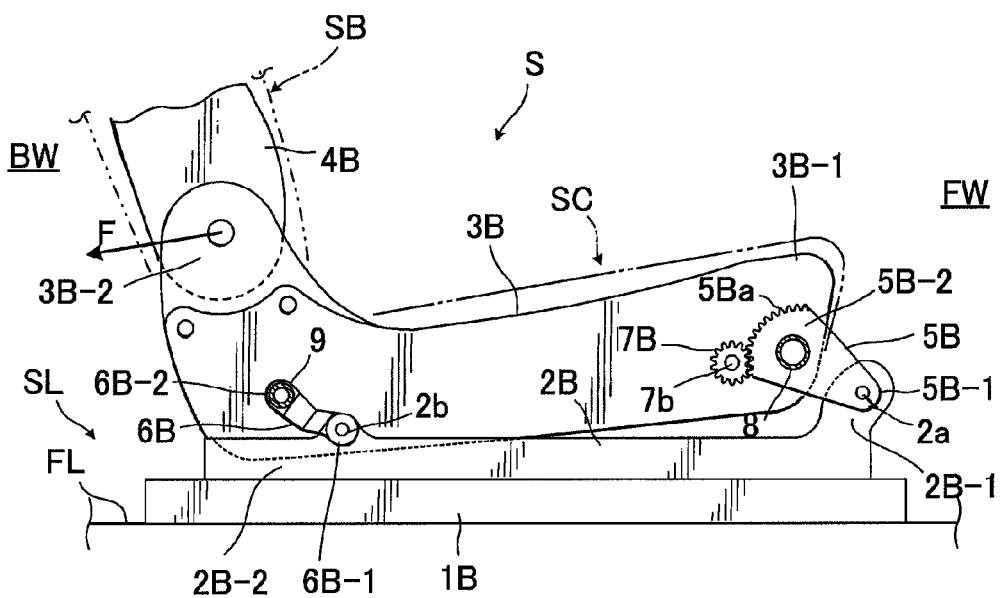
FIG. 4 is a side view of the right side of vehicle seat, which shows deformation of a right-side rear link.

FIGS. 1 and 2 depict a left side of the seat (S) from which it is to be understood that there are shown an inward surface of the left-side lateral frame member (3A) and inward sides of the left-side upper and lower rails (2A) (1A), and that both of those inward surface and inward sides naturally face inwardly of the seat (S). On the other hand, FIGS. 3 and 4 depict a right side of the seat (S), from which it is to be understood that there are shown an inward surface of right-side lateral frame member (3B) and inward sides of the right-side upper and lower rails (2B) (1B) and that both of those inward surface and inward sides naturally face inwardly of the seat (S).

In this connection, the left- and right-side lateral frame members (1A) (1B) are spaced apart from each other, with the two inward surfaces respectively of those two lateral frame members (1A) (1B) being in an opposingly faced relation with each other.

Now, on the understanding of the foregoing illustration in the drawings, a description will be made of the vehicle seat (S) of the present invention in further details.

As stated earlier, the seat (S) is provided with a seat lifter mechanism which is not designated in the Figures. In accordance with the present invention, as one of the constituent parts of such seat lifter mechanism, there are provided a pair of left- and right-side front sector links (5A) and (5B) and a pair of left- and right-side rectilinearly extending rear links (6A) and (6B). Basically, those four links (5A, 5B, 6A and 6B) are arranged in a vertically movable manner between the seat cushion (SC) and seat slide device (SL) (or a floor of vehicle designated by FL) in a parallel linkage fashion, as found in the art, such that the two front links (5A) (5B) are maintained in a parallel relation with the respective two rear links (6A) (6B), whenever those all four links are pivotally articulated vertically in synchronized way.

It is noted here that the seat slide device (SL) itself may not be used, in which case, all lower end portions of the aforementioned four links (5A, 5B, 6A and 6B) may be directly or indirectly connected to the floor (FL) in an appropriate manner, using a suitable means.

Further, briefly stated, as a drive source for actuating the seat liter mechanism, a motor (M) is provided only on the side of the left lateral frame member (3A). The motor (M) has an output shaft fixed to a drive pinion (7A), the details of which will be explained later.

Specifically, according to the shown embodiment, as seen in FIG. 1, the left-side front sector link (5A) is so formed to have: a lower end portion (5A-1) pivotally connected via a pin (2a) with a forward end portion (2A-1) of the left-side upper rail (2A); and an upper widened portion (5A-2) diverging upwardly from the lower end portion (5A-1). It is noted here that the upper widened portion (5A-2) has an arcuate gear region (5Aa) formed in the outer end thereof, wherein such arcuate gear region (5Ba) extends along the circumference of a circle having its center at the afore-said pin (2a).

On the other hand, as seen in FIG. 3, the right-side front sector link (5B) is formed to have: a lower end portion (5B-1) pivotally connected via a pin (2a) with a forward end portion (2B-1) of the right-side upper rail (2B); and an upper widened portion (5B-2) diverging upwardly from the lower end portion (5B-1). It is noted here that the upper widened portion (5B-2) has a arcuate gear region (5Ba) formed in the outer end thereof, wherein such arcuate gear region (5Ba) extends along the circumference of a circle having its center at the afore-said pin (2a).

Both two upper widened portions (5A-2) and (5B-2) respectively of the left- and right-side front sector links (5A) and (5B) are rotatably connected, via a front connecting shaft (8), with the left- and right-side lateral frame members (3A) and (3B), respectively.

The front connecting shaft (8) is of a tubular configuration having a hollow therein, and as understandable from the hatched cross-section thereof and by comparatively looking at the FIGS. 1 and 3, it is to be seen that the front connecting shaft (8) itself is extended horizontally between the left- and right-side lateral frame members (3A) (3B). More specifically, though not clearly shown, the front connecting shaft (8) are at the left- and right-side ends thereof rotatably secured in the respective two forward end portions (3A-1) and (3B-1) of the left- and right-side lateral frame members (3A) and (3B). And, welded respectively fast on and about the left- and right-side end portions of that connecting shaft (8) are the previously mentioned left- and right-side front sector link's upper portions (5A-2) and (5B-2). Accordingly, those two upper end portions (5A-2) (5B-2) are in an interlocked relation with the free-to-rotate front connecting shaft (8) and thereby rotatable together synchronously relative to a central axis of that particular front connecting shaft (8).

As seen in FIG. 1, the left-side rear link (6A) is at the upper end (6A-2) thereof pivotally connected, via a rear connecting shaft (9), with a backward end portion (3A-2) of the left-side lateral frame member (3A), while being at the lower end (6A-1) thereof pivotally connected, via a pin (2b), with a backward end portion (2A-2) of the left-side upper rail (2A) On the other hand, as seen in FIG. 3, the right-side rear link (6B) is at the upper end (6B-2) thereof pivotally connected, via the rear connecting shaft (9), with a backward end portion (3B-2) of the right-side lateral frame member (3B), while being at the lower end (6B-1) thereof pivotally connected, via a pin (2b), with a backward end portion (2B-2) of the right-side upper rail (2B).

Likewise as in the front connecting rod (8), the rear connecting shaft (9) is also of a tubular configuration having a hollow therein, and as understandable from the hatched cross-section thereof and by comparatively looking at the FIGS. 1 and 3, it is to be seen that the rear connecting shaft (9) itself is extended horizontally between the left- and right-side lateral frame members (3A) (3B) so as to be in parallel with the front connecting shaft (8). More specifically, though not clearly shown, the rear connecting shaft (9) are at the left- and right-side ends thereof rotatably secured in the respective two backward end portions (3A-2) and (3B-2) of left- and right-side lateral frame members (3A) and (3B). And, welded respectively fast on and about the left- and right-side end portions of that connecting shaft (9) are the previously mentioned left- and right-side rear link's upper end portions (6A-2) (6B-2). Accordingly, those two upper end portions (6A-2) (6B-2) are in an interlocked relation with the free-to-rotate rear connecting shaft (9) and thereby rotatable together synchronously relative to a central axis of that particular rear connecting shaft (9).

Designation (7A) in FIG. 1 denotes a drive pinion gear which is in a meshed engagement with the previously mentioned arcuate gear region (5Aa) of the left-side sector link (5A). This drive pinion (7A) is shown in the FIG. 1 as being fixed to a drive shaft (7a) of the motor (M) disposed on the side of left lateral frame member (3A).

While not shown, the motor (M) is electrically connected with a switch and provided with a brake unit or reduction gear, as normally known in the art. Namely, by operating the switch, the motor (M) works to rotate the drive pinion (7A) in normal and reverse directions, and by turning off the switch, the motor (M) is stopped and the drive shat (7a) thereof is locked by the brake unit or reduction gear against rotation.

Designation (7B) in FIG. 3 denotes a free-to-rotate pinion fixed to a rotating pin (7b). The rotating pin (7b) is rotatably connected with the right-side lateral frame member (3B), and therefore the pinion (7B) is free to rotate at the right-side lateral frame member (3B). As shown in the FIG. 3, the free-to-rotate pinion (7B) is meshed with the previously mentioned arcuate gear region (5Ba) of right-side front sector link (5B).

As constructed above, in brief, upon operation of the motor (M), the drive pinion (7A) meshed with the arcuate gear region (5Aa) of left-side front sector link (5A) is rotated, whereby both two front sector links (5A) (5B) are rotatively displaced in vertical direction relative to the respective two pins (2a) in synchronized way via the front connecting shaft (8). Simultaneous therewith, both two rear links (6A) (6B) are rotatively displaced in vertical direction relative to the respective two pins (2b) in synchronized way via the rear connecting shaft (9). In that manner, a seat occupant can control the motor (M) by operating a switch or the like to adjustingly raise and lower the seat (S) to a desired level. When the seat occupant stops the motor (M) by turning off the switch, all the four links (5A, 5B, 6A and 6B) are stopped at a given angle of inclination relative to the slide device (SL) or the floor (FL) and retained against movement due to the meshed engagement of the two pinions (7A) (7B) with the respective two arcuate gear regions (5Aa) (5Ba), so that the seat occupant can set the seat (S) at a desired level.

In accordance with the present invention, it is important to note the following points:
  (i) Both two rear links (6A) and (6B) are prone to bending or deformation by an excessive great impact to be imparted thereto though an excessive great load applied to the seat (S) from a seat occupant in the case of rear-end collision.
  (ii) On the other hand, the two front sector links (5A) and (5B) are in a meshed engagement with the respective two pinions (7A) and (7B) which are situated backwardly of those particular front sector links (5A) (5B), thereby providing a robust structure sufficient to withstand the excessive great impact stated above.

Namely, referring to FIGS. 3 and 4, when a rear-end collision occurs, an excessive great load (at F) is applied to the seat (S) from an upper body portion of seat occupant which is abruptly displaced backwardly and downwardly under inertial to the seat (S). In that case, as indicated by the arrow (F), normally, a corresponding excessive great impact is intensively imparted to a relatively brittle joint portion between the seat back (SB) and seat cushion (SC) where a relatively brittle reclining device (not shown) is provided as commonly known in the art. But, at that moment, both two rear links (6A) (6B) are quickly bent as shown in both FIGS. 3 and 4, such that a substantially midway area of the left-side rear links (6A) between the upper and lower end portions (6A-2) (6A-1) thereof is bent inwardly or outwardly of the seat (S). while at the same time, a substantially midway area of the right-side rear links (6B) between the upper and lower end portions (6B-2) (6B-1) thereof is bent inwardly or outwardly of the seat (S). Such simultaneous bending of both two rear links (6A) (6B) absorbs the excessive great impact (at F), thereby avoiding intensive exertion of the impact on the relatively brittle portion of the seat (S) and preventing that brittle portion against deformation.

It is therefore appreciated that both two rectilinearly extending rear links (6A) (6B) are used as they are, without changing its original rectilinear shape. In other words, those rear links (6A) (6B) may be so designed to be simply bendable or deformable, only by considering a suitable thickness thereof and/or a suitable material thereof, for the above-explained impact absorption purpose. Hence, there is no need to form any uneven or cut-away area in the rear links (6A) (6B) and no other separate element is required therefor. As such, it is important each of the two rear links (6A) (6B) should be properly formed from a suitable metallic material so as to have a thickness that allows the rear link per se to be bent or deformed by an excessive great load to be applied thereto in the case of rear-end collision.

Further, the meshed engagement of the two arcuate gear regions (5Aa) (5Ba) with the respective two pinions (7A) (7B) and the disposition of the two pinions (7A) (7B) backward of the respective two front sector links (5A) (5B) in effect renders the two pinions (7A) (7B) a stopper to prevent downward displacement of both two front sector links (5A) (5B), while withstanding the excessive great load (F), whereby a forward end portion of the seat cushion (SC) is retained substantially at a given level without being displaced downwardly in the case of rear-end collision. This is due to the fact that, when a rear-end collision occurs, an excessive great load (F) is applied to the seat (S) in the backward and downward direction, and in particular, a backward component force of the load (F) is applied from the two front sector links (5A) (5B) directly to the two pinions (7A) (7B) at a large amount as compared with a downward component force of the load (F), which strongly enhances the meshed engagement between the two pinions (7A) (7B) and the respective two gear regions (5Aa) (5Ba) of two front sector links (5A) (5B) to such an extent that both of the pinions (7A and 7B) and front sector links (5A and 5B) are not rotated in any direction. Thereby, both two lateral frame members' forward end portions (3A-1) (3B-1) are locked against downward displacement, so that the forward end portion of the seat cushion (SC) is not lowered and retained at a level substantially equal to the level where it has been positioned before the rear-end collision. As a consequence thereof, a whole of the excessive great load (F) is transmitted backwardly in a direction to the two lateral frame members' backward end portions (3A-2) (3B-2) and intensively applied to both two rear links (6A) (6B) which are in turn quickly bent or deformed as shown in FIGS. 2 and 4 to absorb a corresponding excessive great impact which might be imparted to a relatively brittle portion of the seat (S).

In addition, the above-explained meshed engagement of the two front sector links (5A) (5B) with the respective two pinions (7A) and (7B) also insures to retain the seat cushion (SC) on a horizontal plane, without being inclined in any of leftwise and rightwise directions, although the seat (S) itself is slightly inclined backwardly due to the above-described downward bending of both two rear links (6A) (6B). Therefore, it is also possible to prevent lowering or downward inclination of one lateral side of the seat (S).

While having described the present invention thus far, it is to be understood that the invention is not limited to the illustrated embodiment, but any modification, addition and replacement may be applied thereto, without departing from the scopes of the appended claims. For example, the right-side front sector link (5B) may be replaced by an appropriate rectilinearly extending front link, and the right-side pinion (7B) may not be used. In that case, such rectilinearly extending front link may be of a rigidity greater than the right-side rear link (6B) and be pivotally connected between the right-side lateral frame member (3B) and the right-side upper rail (2B) or the floor (F). Further, with regard to a drive source for the drive pinion (7A), instead of the motor (M), an appropriate manual lever or manual rotating knob may be connected with the drive pinion (7A), in which case, a brake unit or gear reduction unit be incorporated in that, manual lever or knob, so that the drive pinion (7A) will be locked against rotation every time the lever or knob is stopped at a given position.

What is claimed is:

1. A vehicle seat for use in a vehicle having a floor therein, comprising:

a seat cushion frame including a first lateral frame member and a second lateral frame member, wherein said first lateral frame member has a forward portion adapted for facing forwardly of said vehicle and a backward portion adapted for facing backwardly of said vehicle, and said second lateral frame member has a backward portion adapted for facing backwardly of said vehicle and a forward portion adapted for facing forwardly of said vehicle, a drive pinion rotatably provided to said first lateral frame member, said drive pinion being operatively connected with a drive source;

a first front link element of sector shape having: a lower end portion adapted for being pivotally secured on said floor of said vehicle; and an upper widened end portion so formed to diverge from said lower end portion, said upper widened end portion being pivotally connected with said forward portion of said first lateral frame member;

said first front link element having an arcuate gear region defined in said upper widened end portion thereof, said arcuate gear region being in meshed engagement with said drive pinion and so arranged as to face backwardly of the seat;

said drive pinion being disposed backward of said arcuate gear region;

a second front link element having an upper end portion pivotally connected with said forward portion of said second lateral frame member, and a lower end portion adapted for being pivotally fixed on said floor of said vehicle;

a connecting element interlocking said first and second front link elements such that said first and second front link elements are movable vertically in a synchronized way;

a first rear link element having an upper end portion pivotally connected with said backward portion of said first lateral frame member, and a lower end portion adapted for being pivotally fixed on said floor of said vehicle; and a second rear link element having an upper end portion pivotally connected with said backward portion of said second lateral frame member, and a lower end portion adapted for being pivotally fixed on said floor of said vehicle;

wherein said first and second rear link elements are prone to deformation by an excessive great load applied backwardly and downwardly to the seat in case of rear-end collision, thereby absorbing a corresponding excessive great impact.

2. The vehicle seat as claimed in claim 1, wherein said second front link element is a second front link element of sector shape which has: an upper widened portion defined in an upper area thereof corresponding to said upper end portion of the second front link element; and an arcuate gear region defined in said upper widened portion, wherein a pinion is provided to said second lateral frame member in a free-to-rotate manner, wherein said pinion is disposed backward of said arcuate gear region of said second front link element of sector shape, while being in meshed engagement therewith, wherein said connecting element comprises a connecting shaft rotatably journalled between said first and second lateral frame members; and wherein said second front link element of sector shape and said first front link element are both fixed on said connecting shaft, so as to be rotatable in a synchronized way relative to a central axis of said connecting shaft.

* * * * *